(12) United States Patent
Hibino et al.

(10) Patent No.: US 6,393,383 B1
(45) Date of Patent: May 21, 2002

(54) SETTING APPARATUS AND METHOD FOR IDENTIFICATION SIGNAL

(75) Inventors: Ryoichi Hibino; Masataka Osawa; Eiichi Ono; Shu Asami; Toshinari Suzuki, all of Aichi-ken; Katsumi Kono; Tomohiro Asami, both of Toyota, all of (JP)

(73) Assignee: Toyota Jidosha Kabushi Kaisha, Toyota (JP)

( * ) Notice: Subject to any disclaimer, the term of this patent is extended or adjusted under 35 U.S.C. 154(b) by 103 days.

(21) Appl. No.: 09/628,425

(22) Filed: Jul. 28, 2000

(30) Foreign Application Priority Data

Aug. 11, 1999 (JP) ............................................ 11-227515

(51) Int. Cl.$^7$ ........................... G06F 19/00; B60K 41/02
(52) U.S. Cl. ........................... 702/189; 702/73; 702/124; 477/166; 477/173; 477/176; 701/67; 701/68
(58) Field of Search ............................... 702/69, 72–75, 702/81, 84, 124, 189–191; 701/67, 68, 82; 477/166, 171, 173, 174–176, 181; 700/41–42

(56) References Cited

U.S. PATENT DOCUMENTS

| | | | |
|---|---|---|---|
| 4,539,633 A | | 9/1985 | Shigemasa et al. |
| 4,716,347 A | * | 12/1987 | Fujimoto ..................... 318/460 |
| 5,803,868 A | * | 9/1998 | Kono et al. .................. 477/168 |
| 5,857,443 A | * | 1/1999 | Kono et al. .................. 477/176 |
| 6,039,675 A | * | 3/2000 | Adachi et al. ............... 477/174 |
| 6,316,904 B1 | * | 11/2001 | Semenov et al. ........... 318/727 |

FOREIGN PATENT DOCUMENTS

| | | |
|---|---|---|
| EP | 0 378 093 | 7/1990 |
| FR | 2 645 979 | 10/1990 |
| JP | 2864963 | 12/1998 |
| JP | 11-102203 | 4/1999 |

OTHER PUBLICATIONS

Masahiko Nagayasu, et al., "Automatic Landing Flight Experiment (ALFLEX) of a Hope Scaled Model", The Japan Society for Aeronautical and Space Sciences Journal, vol. 46, No. 528, Jan., 1998, pp. 2–11 (with partial English translation).

* cited by examiner

*Primary Examiner*—Bryan Bui
(74) *Attorney, Agent, or Firm*—Oblon, Spivak, McClelland, Maier & Neustadt, P.C.

(57) ABSTRACT

A characteristics change of a control object is functionally represented by a parameter $\theta$ which varies between values of 0 and 1 as the gain of the control object is surveyed. The frequency of the identification signal is set at a frequency where the difference in gains becomes large. The amplitude of the identification signal is set so that the variation width of the output of the control object is less than or equal to a predetermined value. Because the identification accuracy improves where the input/output characteristics with respect to the parameter are more sensitive, the identification signal set by such a setting apparatus imparts high identification accuracy. Moreover, because the amplitude of the identification signal is set based on the variation width of the output of the control object, identification can be performed without significantly affecting the output of the control object.

10 Claims, 4 Drawing Sheets

SETTING APPARATUS AND METHOD FOR IDENTIFICATION SIGNAL

BACKGROUND OF THE INVENTION

1. Field of the Invention

The present invention relates to an apparatus and method for setting an identification signal, and more particularly to a setting apparatus and setting method for setting an identification signal to be added to a controller instruction value to estimate a parameter value used to functionally represent a characteristics change of a control object and which varies within a predetermined range.

2. Description of the Related Art

A type of setting apparatus for identification signals has been proposed in which an M-sequence signal is added during an automatic landing flight experiment (ALFLEX) of a HOPE scaled model to obtain aerodynamic characteristics data (for example, refer to "Automatic Landing Flight Experiment (ALFLEX) of a HOPE Scaled Model", Japan Aerospace Association, January, 1998, Vol. 46, No. 528). An M-sequence (Maximum-length linear shift register sequence) signal is a pseudo-irregular signal that can be considered to approximate white noise and is one of the most well known and commonly used input signals for system identification.

However, this method of adding the M-sequence signals has an inherent problem in that identification accuracy and stability will not be constant with respect to time. Normally, because the input frequency component changes with time, there are times when the frequency component is within a region where the characteristics change of the control object is sharply reflected and times when the frequency component is within a region where the characteristics change of the control object is not reflected as sharply. When the input frequency component is at a frequency region where the characteristics change of the control object is sharply reflected, change becomes large and the identification accuracy improves, whereas the identification accuracy is reduced when the input frequency is at a frequency region where the characteristics change of the control object is not as sharply reflected. This problem becomes even more prominent when there is a disturbance.

SUMMARY OF THE INVENTION

One object of the present invention is to provide a setting apparatus for an identification signal that can accurately and stably identify a parameter representing a characteristics change of a control object without significantly affecting the output of the control object.

In order to solve the object mentioned above, the present invention employs the following.

According to one aspect of the present invention, there is provided a setting apparatus for an identification signal for setting an identification signal to be added to a controller instruction value to estimate a parameter value used to functionally represent a characteristics change of a control object and which varies in a predetermined range, said setting apparatus comprising frequency setting means for setting a frequency based on difference among gains when said parameter is sequentially varied within said predetermined range; amplitude setting means for setting an amplitude based on a variation width of the output of said control object; and signal setting means for setting said identification signal as a periodic signal with frequency set by said frequency setting means and amplitude set by said amplitude setting means.

With the setting apparatus for an identification signal according to the present invention, because the frequency is set by the frequency setting means based on the difference among the gains when the parameter is sequentially varied within a predetermined range, the frequency of the identification signal can be set to a frequency with high identification accuracy. As a result, identification can be performed with high accuracy. Moreover, because the amplitude is set by the amplitude setting means based on the variation width of the output of the control object, the output of the control object is not significantly affected.

According to another aspect of a setting apparatus for an identification signal of the present invention, the frequency setting means can be means for setting a frequency so that the difference in gain becomes larger. In this manner, the frequency of the identification signals can be set at a frequency where a characteristics change in the control object is sharply reflected, and thus identification can be more accurately performed.

According to another aspect of a setting apparatus of the present invention, said amplitude setting means can be means for setting an amplitude so that said variation width is less than or equal to a predetermined value. In this manner, the amplitude of the output of the control object can be maintained at a value less than or equal to the predetermined value. In this case, the predetermined value can be set at an allowed variation width for the output of the control object or at a value less than this value. In this manner, identification can be performed without significantly affecting the output of the control object.

According to another aspect of the present invention, said identification signal can be a periodic signal of square wave.

According to another aspect of the present invention, there is provided a setting method for an identification signal for setting an identification signal to be added to a controller instruction value to estimate a parameter value used to functionally represent a characteristics change of a control object and which varies within a predetermined range, said setting method comprising the steps of, (a) setting a frequency based on difference in gains when said parameter is sequentially varied within said predetermined range; (b) setting an amplitude based on a variation width of the output of said control object; and (c) setting said identification signal as a periodic signal having said set frequency and said set amplitude.

In this setting method for an identification signal according to the present invention, because the frequency is set based on the difference between gains when the parameter is sequentially varied within a predetermined range, the frequency of the identification signal can be set at a frequency of high identification accuracy. As a result, identification can be performed with high accuracy. Moreover, because the amplitude is set based on the variation width of the output of the control object, the output of the control object is not significantly affected.

According to another aspect of the present invention, in step (a) of the setting method of the identification signal, the frequency can be set at a frequency where said difference between gains becomes larger. In this manner, the frequency of the identification signal can be set at a frequency where the characteristics change in the control object is sharply reflected so that identification can be performed with a higher accuracy.

According to another aspect of the present invention, in step (b) of the setting method of the identification signal, the amplitude can be set so that said variation width is less than or equal to a predetermined value. In this manner, the amplitude of the output of the control object can be set to be less than or equal to a predetermined value. In this case, an allowed variation width of the output of the control object or a value less than this value can be used as the predetermined value. In this manner, identification can be performed without affecting the output of the control object.

According to another aspect of the present invention, in step (c) of the setting method of identification signals, the identification signal can be set as a periodic signal of square wave.

DESCRIPTION OF THE PREFERRED EMBODIMENT

Figure 1:
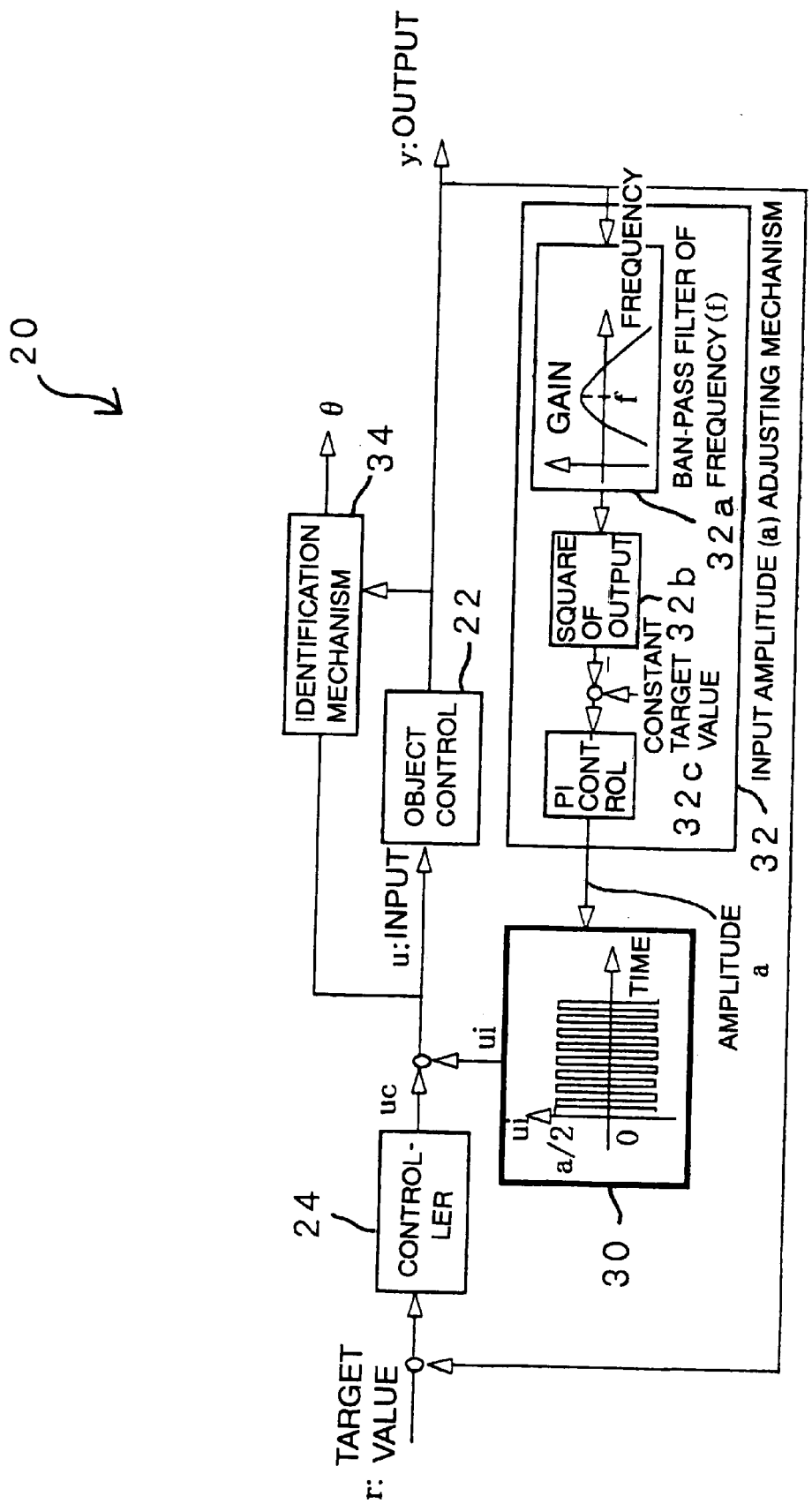
FIG. 1 is a block diagram exemplifying a control system 20 to which an identification is signal set by a setting apparatus according to a preferred embodiment of the present invention is input.

The preferred embodiment of the present invention will next be described using examples. FIG. 1 is a block diagram exemplifying a control system 20 to which identification signals are input, the identification signal being set by a setting apparatus of an identification signal according to one embodiment of the present invention. As shown in the figure, the control system 20 comprises a feedback control system comprising a control object 22 and a controller 24 for inputting an output y of the control object 22 and its target value r and outputting an instruction value uc, an input amplitude adjusting mechanism 32 for setting an amplitude a of an identification signal ui, an identification signal generator 30 for generating the identification signal ui based on the amplitude a set by the input amplitude adjusting mechanism 32, an identifying mechanism 34 for estimating a parameter θ based on an instruction value u to the signal control object 22 and the output y of the control object 22, the instruction value u being constructed by adding identification signal ui generated by the identification signal generator 30 to a signal uc from the controller 24. An example of the control object 22 includes, for example, a clutch control system of an automobile automatic transmission. The control object can be represented by the following equation (1) showing the characteristics changes of the control object as a function of a parameter θ, which varies between values of 0 and 1.

$$xp(n+1)=Ap(\theta)xp(n)+Bp(\theta)u(n)$$

$$y(n)=Cp(\theta)xp(n)+Dp(\theta)u(n) \quad (1)$$

Here, y is the output of the control object, u is the instruction value to be input to the control object, and xp is the quantity of state. The terms $Ap(\theta)$, $Bp(\theta)$, $Cp(\theta)$, and $Dp(\theta)$ that appear on the right sides of the equations can be represented by the following equation (2). In the equation (2), each of Ap1, Ap2, Bp1, Bp2, Cp1, Cp2, Dp1, and Dp2 represents a coefficient matrix.

$$Ap(\theta)=Ap1*\theta+Ap2*(1-\theta)$$

$$Bp(\theta)=Bp1*\theta+Bp2*(1-\theta)$$

$$Cp(\theta)=Cp1*\theta+Cp2*(1-\theta)$$

$$Dp(\theta)=Dp1*\theta+Dp2*(1-\theta) \quad (2)$$

In the embodiment, the frequency of the identification signal is set as follows. If the gain is calculated by representing the control object by the equation (3), the gain can be represented as a function of the parameter θ, as shown in the equation (4). The parameters a10, a20, etc. are elements of the coefficient matrices Ap1 and Ap2, and parameters b10, b20, etc. are elements of the coefficient matrices Bp1 and Bp2.

$$xp(n+1) = \begin{bmatrix} -\theta a12 - (1-\theta)a22 & 1 & 0 \\ -\theta a11 - (1-\theta)a21 & 0 & 1 \\ -\theta a10 - (1-\theta)a20 & 0 & 0 \end{bmatrix} xp(n) +$$

$$\begin{bmatrix} \theta b12 + (1-\theta)b22 \\ \theta b11 + (1-\theta)b21 \\ \theta b10 + (1-\theta)b20 \end{bmatrix} u(n)$$

$$y(n) = xp(n)$$

$$|G(jw)| = 20\log(f(\theta)^{0.5}) \quad (4)$$

$$f(\theta) = \frac{(A3\theta + B3)^2 + (A4\theta + B4)^2}{(A1\theta + B1)^2 + (A2\theta + B2)^2}$$

A case of a clutch control system is considered here as an example. If the following values are used for each of the elements of the coefficient vectors shown in equation (3), the frequency characteristics of gain and phase with the parameter θ varied can be shown as in FIG. 2.

Figure 2:
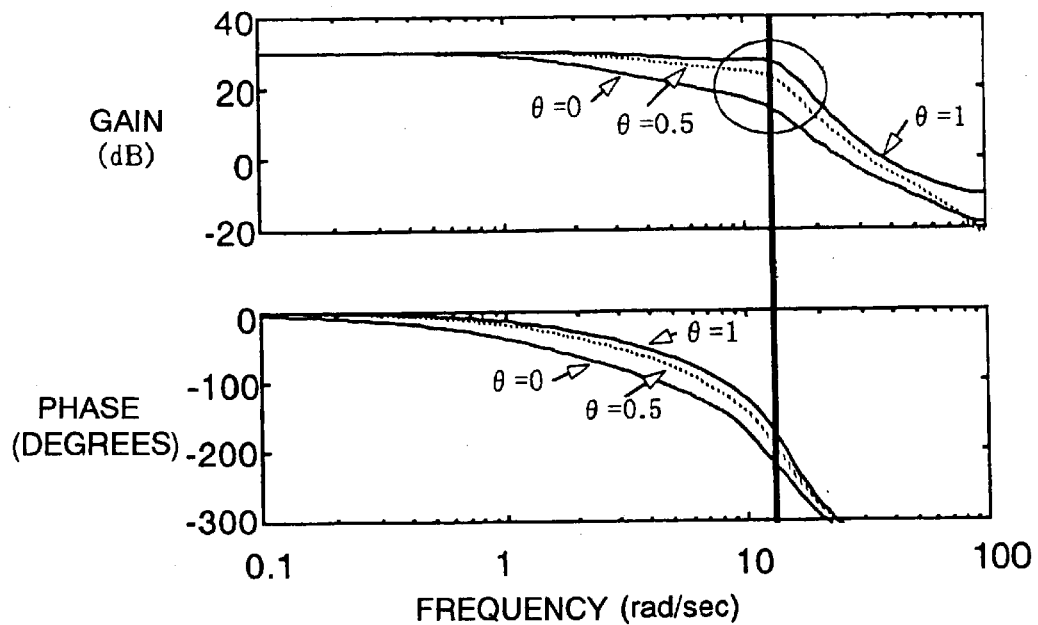
FIG. 2 is a diagram explaining frequency characteristics of gain and phase when a parameter θ is varied.

$a12 = 2.4142 \quad b12 = 0.2594 \quad a22 = 2.4898 \quad b22 = -0.0240$ $a11 = -2.0860 \quad b11 = -0.5868 \quad a21 = -2.1529 \quad b21 = -0.0378$ $a10 = 0.6411 \quad b10 = 1.3112 \quad a20 = 0.6552 \quad b20 = 0.3164$ As shown in FIG. 2, the frequency region where the difference in gain with respect to the parameter θ is sharply reflected occurs around the region represented by a circle. As an example, 12 [rad/sec] can be selected as shown by a bold line in FIG. 2. This value corresponds to a frequency of approximately 2 [Hz] and the frequency of the identification signal is set at this value. As already mentioned, by setting the frequency of the identification signal within the frequency range where difference in gains with respect to the parameter θ is sharply reflected, the accuracy of identification accuracy can be improved.

Figure 3:
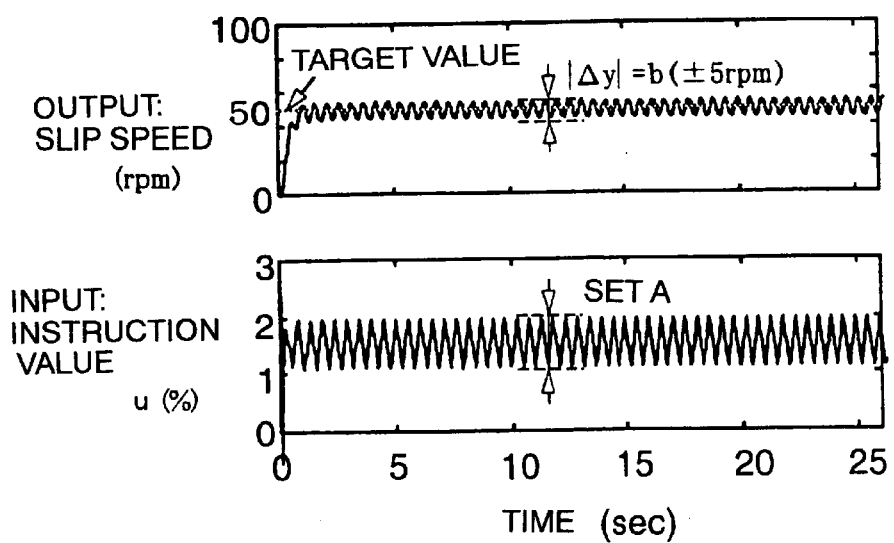
FIG. 3 is an explanatory diagram showing setting of an identification signal amplitude using a target value which is set based on a variation width Ay of slip speed which is the output of a clutch control system.

Next, the setting of the amplitude of the identification signal in the embodiment is described. The amplitude of the identification signal is set by an input amplitude adjusting mechanism 32 exemplified in FIG. 1, based on the output y of the control object 22. The input amplitude adjusting mechanism 32 comprises a band-pass filter 32a which passes the frequency of the identification signal as set by the above mentioned method among the frequencies of the output y, a square calculator 32b for calculating the square of the output passing through the band-pass filter 32a, and a controller 32c which PI controls the amplitude of the identification signal so that the output from the square calculator 32b is at its target value. In a case of a clutch control system in which the output y of the control object 22 is the clutch slip speed, if the period of the identification signal is set at 2 [Hz] and the target value for comparing with the output from the square calculator 32b of the input amplitude adjusting mechanism 32 is set based on the variation width $\Delta y$ (±5 [rpm]) of the clutch slip speed, because the amplitude a of the identification signal is set by the input amplitude adjusting mechanism 32 and the signal is added to the instruction value uc of the controller 24, the instruction value u input to the control object 22 will take form as shown in FIG. 3. In the embodiment, the identification signal is set as a square wave having set frequency and amplitude.

Figure 4:
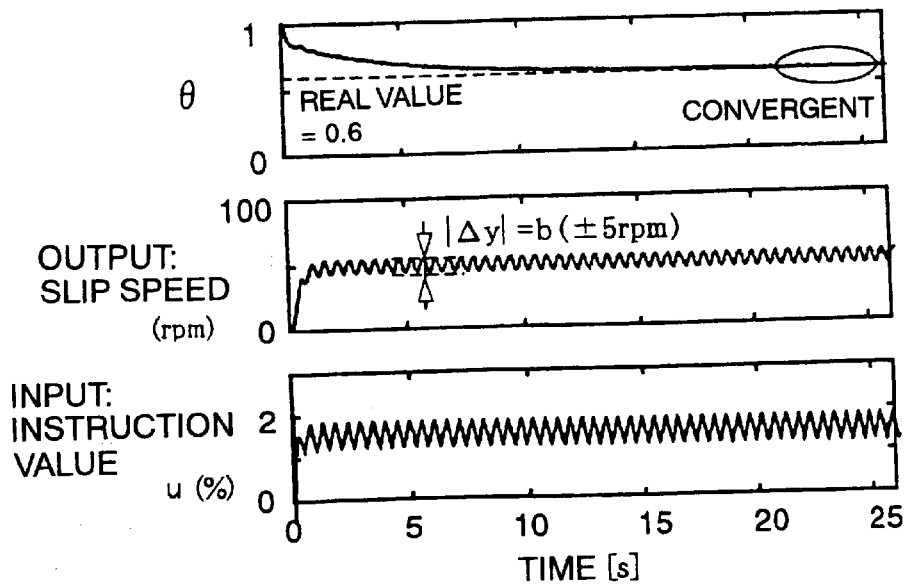
FIG. 4 is an explanatory diagram exemplifying the progress of a parameter θ, clutch slip speed, and instruction value when the parameter θ is estimated using the identification signal set by the setting apparatus according to the present invention.
Figure 5:
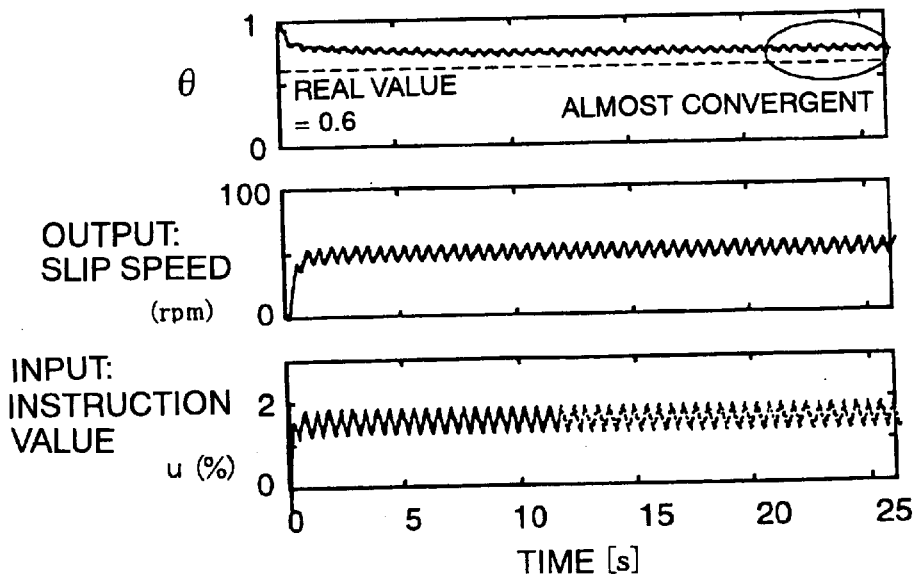
FIG. 5 is an explanatory diagram exemplifying the progress of a parameter θ, clutch slip speed, and instruction value when the parameter θ is estimated with a disturbance using the identification signal set by the setting apparatus according to the present invention.
Figure 6:
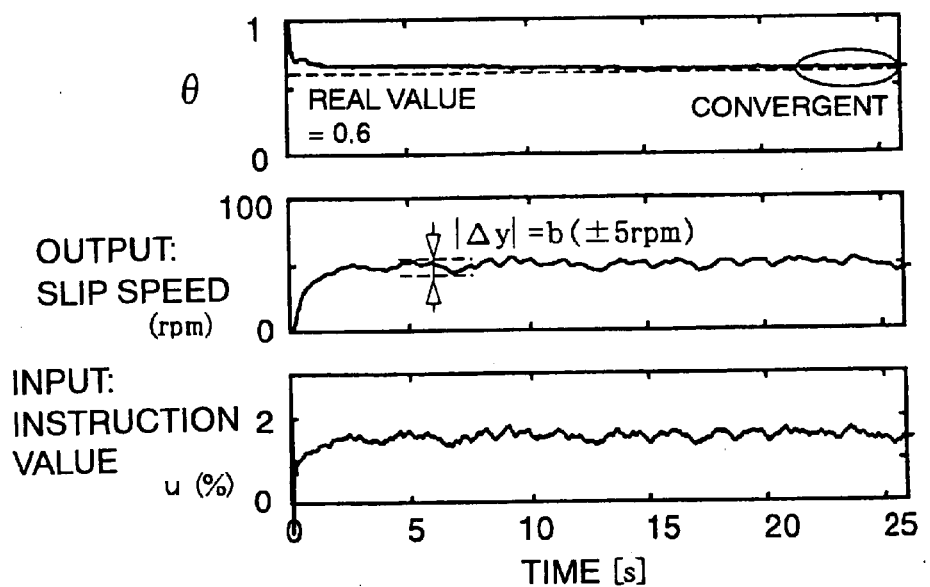
FIG. 6 is an explanatory diagram exemplifying the progress of a parameter θ, clutch slip speed, and instruction value when the parameter θ is estimated using an M-sequence signal.
Figure 7:
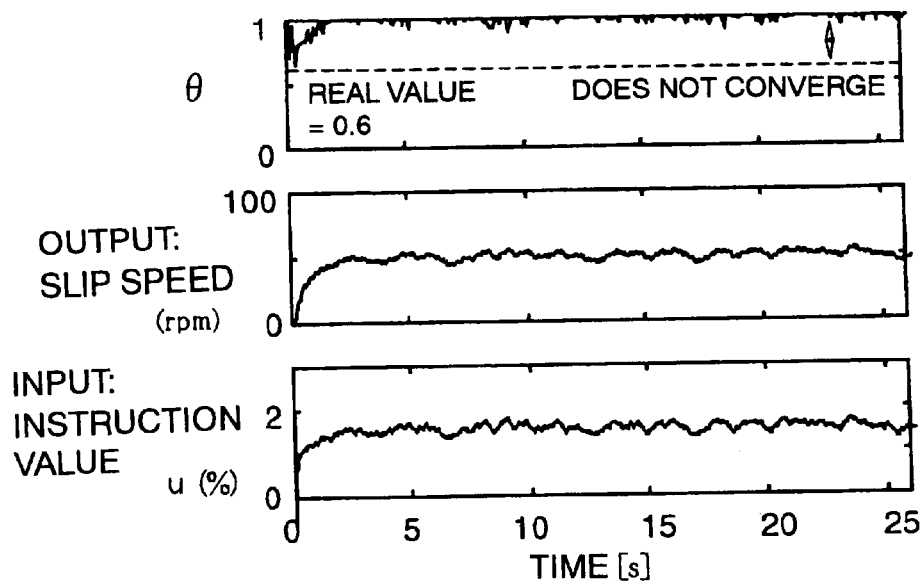
FIG. 7 is an explanatory diagram exemplifying the progress of a parameter θ, clutch slip speed, and instruction value when the parameter θ is estimated with a disturbance using an M-sequence signal.

A case of a clutch control system is considered here as an example. FIG. 4 shows the progress of the parameter θ, clutch slip speed, and instruction value when the parameter θ is estimated using an identification signal set by the setting apparatus of the embodiment without a disturbance and FIG. 5 shows similar progress with a disturbance of 4 [Hz]±1 [rpm] added to the slip speed. For comparison purpose, similar progress using the M-sequence signal as an identification signal to the same control object without a disturbance is shown in FIG. 6 and the M-sequence signal result with a disturbance is shown in FIG. 7. As shown in FIGS. 4 and 6, when there is no disturbance, the parameter θ converges for both cases of using the identification signal set by the setting apparatus of the embodiment and using M-sequence signal, and therefore, identification can be performed with high accuracy in either case. However, as can be seen from FIGS. 5 and 7, when there is a disturbance, while the parameter θ converges when the identification signal set by the setting apparatus of the present invention is used and thus identification is possible, the parameter θ does not converge when the M-sequence signal is used and thus identification is impossible. With the present invention, identification is possible even with the disturbance present because (a) a frequency region where the characteristics change with respect to the parameter θ is sharply reflected is used, (b) the input power spectrum for each frequency is constant over time unlike the M-sequence signal, and (c) feedback compensation is possible with estimation of the variation component $\Delta y$ of the output y using the band-pass filter of fixed coefficient because the frequency of the variation component of the output y is constant.

The parameter θ representing characteristics change of the control object in clutch control system represents that engine load is large or automatic transmission oil is new when the parameter θ is close to 1 and represents that the engine load is small or automatic transmission oil is degraded when the parameter θ is close to 0.

With the setting apparatus for identification signals according to the present invention as described in the above example, highly accurate identification can be performed regardless of the presence or absence of a disturbance. Moreover, the output of the control object will not be significantly affected.

Although in the above example setting apparatus for identification signal a square wave is used as the identification signal, other signal shapes, such as a sine or a sawtooth wave, can also be used. Further, while the frequency of the identification signal is set at a frequency where the gain characteristic is the highest with respect to the parameter θ, the frequency of the identification signal can be any frequency that has a high gain characteristic with respect to the parameter θ, and is not limited to the frequency with the highest gain characteristic.

Also, while in the above illustrative embodiment, a clutch control system for an automatic transmission of automobile is used as an example, the setting apparatus is not limited to clutch control system applications and can be applied to any control object which can be represented by the equation (1) using a parameter θ for a characteristics change.

In general, while the preferred embodiment of the present invention is described with an example, the present invention is not limited to the example and can be practiced in various forms without departing from the scope of the present invention.

What is claimed is:

1. A setting apparatus of an identification signal for setting an identification signal to be added to a controller instruction value to estimate a parameter value used to functionally represent a characteristics change of a control object and which varies within a predetermined range, said setting apparatus comprising:

frequency setting means for setting a frequency based on a difference between gains when said parameter is sequentially varied within said predetermined range;

amplitude setting means for setting an amplitude based on variation width of the output from said control object; and signal setting means for setting said identification signal as a periodic signal having the frequency set by said frequency setting means and the amplitude set by said amplitude setting means.

2. A setting apparatus of an identification signal according to claim 1, wherein, said frequency setting means sets a frequency so that said difference in gain becomes larger.

3. A setting apparatus of an identification signal according to claim 1, wherein, said amplitude setting means sets an amplitude so that said. variation width is less than a predetermined value.

4. A setting apparatus of an identification signal according to claim 3, wherein, said amplitude setting means sets an amplitude using a value less than an allowed variation width of the output from the control object as said predetermined value.

5. A setting apparatus of an identification signal according to claim 1, wherein, said identification signal is a periodic signal of square wave.

6. A setting method of an identification signal for setting an identification signal to be added to a controller instruction value to estimate a parameter value used to functionally represent a characteristics change of a control object and which varies in a predetermined range, said setting method comprising the steps of:

(a) setting a frequency based on a difference between gains when said parameter is sequentially varied within said predetermined range;

(b) setting an amplitude based on variation width of the output from said control object; and (c) setting said identification signal as a periodic signal having said set frequency and said set amplitude.

7. A setting method of an identification signal according to claim 6, wherein, step (a) is a step for setting a frequency so that said difference in gain becomes larger.

8. A setting method of an identification signal according to claim 6, wherein, step (b) is a step for setting an amplitude so that said variation width is less than a predetermined value.

9. A setting method of an identification signal according to claim 8, wherein, step (b) is a step for setting an amplitude using a value less than an allowed variation width of the output of the control object as said predetermined value.

10. A setting method of an identification signal according to claim 6, wherein, step (c) is a step for setting said identification signal as a periodic signal of square wave.

* * * * *